S. T. BUCHANAN & H. T. PORTER.
ANTISLIPPING DEVICE.
APPLICATION FILED MAY 25, 1918.
1,292,698.
Patented Jan. 28, 1919.
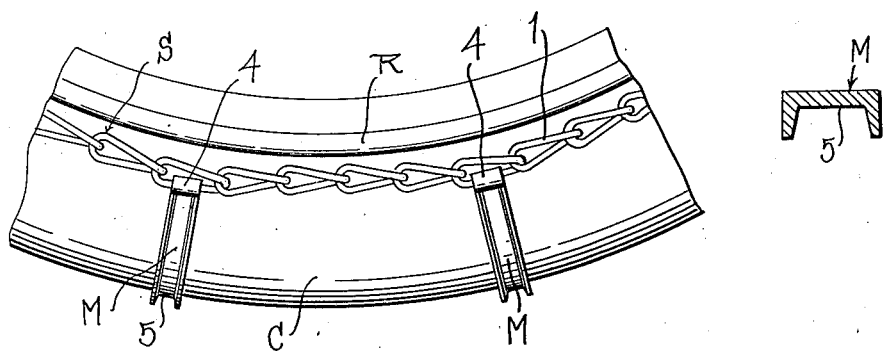
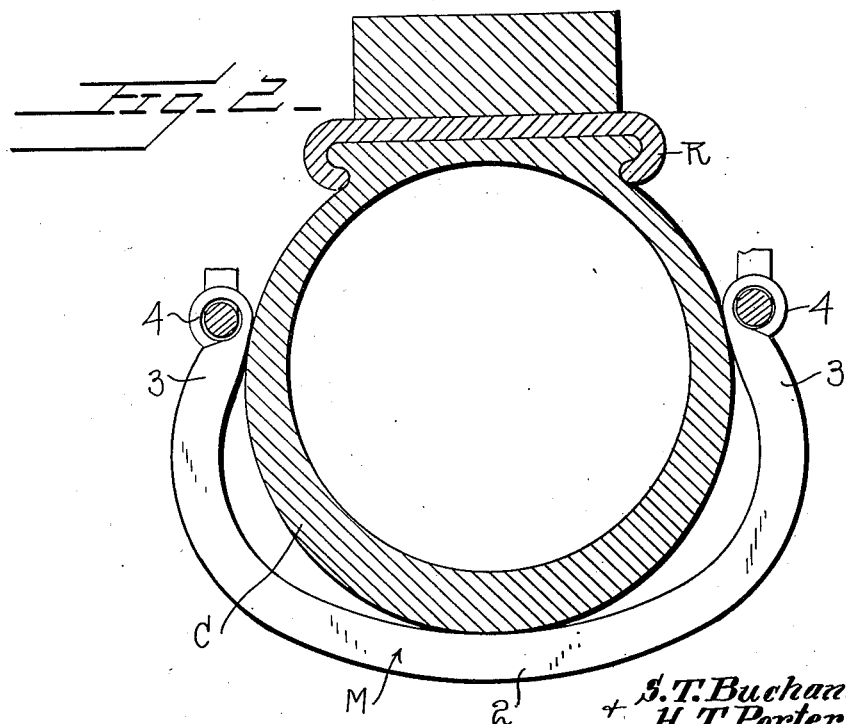
Inventors
S. T. Buchanan
H. T. Porter
By Watson E. Coleman
Attorney

UNITED STATES PATENT OFFICE.

SAMUEL T. BUCHANAN AND HARRISON T. PORTER, OF ABERDEEN, SOUTH DAKOTA, ASSIGNORS TO A. K. S. MFG. CO., OF ABERDEEN, SOUTH DAKOTA, A CORPORATION OF SOUTH DAKOTA.

ANTISLIPPING DEVICE.

1,292,698.  Specification of Letters Patent.  Patented Jan. 28, 1919.

Application filed May 25, 1918. Serial No. 236,610.

*To all whom it may concern:*

Be it known that we, SAMUEL T. BUCHANAN and HARRISON T. PORTER, citizens of the United States, residing at Aberdeen, in the county of Brown and State of South Dakota, have invented certain new and useful Improvements in Antislipping Devices, of which the following is a specification, reference being had to the accompanying drawings.

This invention relates to certain improvements in antislipping devices and has relation more particularly to a device of this general character especially designed and adapted for use in connection with inflatable or cushion tires and it is an object of the invention to provide a device of this general character comprising a plurality of members adapted to straddle the tread portion of a tire whereby each of said members has gripping action upon the tire when the member is in contact with the surface over which the wheel is traveling.

Another object of the invention is to provide a device of this general character including a plurality of novel and improved members which are normally in movable engagement with the tread portion of a tire and which firmly grip the tire upon depression and lateral expansion of the tire incident to the weight of the load as the tire travels over the road-way.

The invention consists in the details of construction and in the combination and arrangement of the several parts of our improved anti-slipping device whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:

Figure 1 is a fragmentary view in side elevation illustrating an anti-slipping device constructed in accordance with an embodiment of our invention and in applied position;

Fig. 2 is an enlarged sectional view taken transversely through a tire casing and its coacting rim showing a unit comprised in our improved device; and Fig. 3 is a sectional view taken transversely of one of the units as herein embodied.

As disclosed in the accompanying drawings R denotes the rim of a vehicle wheel coacting in a conventional manner with the carcass C of an inflatable tire. Bridging or straddling the tread portion of the tire are the members or units M comprised in our improved anti-slipping device. The members or units M may be of any desired number in accordance with the requirements of practice and are maintined in predetermined spaced relation through the medium of the side members S coacting therewith and which side members preferably comprise chains including the twisted links 1 of a well known type. Each of the members or units M is substantially rigid or nonflexible and comprises a central or intermediate portion 2 substantially semi-elliptical in form with its opposite end portions continued by the inwardly extending or converging portions 3. The portions 3 have their free extremities outwardly returned as at 4 to provide the sleeves which are loosely engaged with certain of the links 1 of the side members S and more particularly a side bar of each of said links. The free extremities of the portions 3 are spaced apart a distance slightly in excess of the maximum width of the rim R so that the portions 3 may pass inwardly of the rim upon depression of the carcass C. The portions 3 are also spaced apart a distance slightly less than the maximum width of the carcass C when inflated so that in applying a member or unit M to the carcass C the same can be forced by a slight pressure over the tread portion of the tire yet spaced apart sufficiently to permit a free entrance of the rim R between the portions 3.

The inner faces of the portions 2 and 3 of the member or unit M are of a configuration to conform substantially to the shape the ground engaging portion of the carcass C assumes when the weight of the car or vehicle is imposed thereon so that when the member or unit M is free of contact with the roadway or other surface the central portion only thereof has engagement with the carcass, as is particularly illustrated in Fig. 2.

When the member or unit M first reaches the ground and the weight of the vehicle comes upon that portion of the carcass C the carcass depresses and expands laterally and firmly contacts with the inner faces of the portions 2 and 3 and pressure imposed upon the converging portions 2 of the member results in the member or unit M being held to the carcass C almost as tightly as if it were a part of the carcass and the strain upon the side members S is only negligible.

As the member or unit M leaves the ground and the carcass C returns to its normal condition, the member or unit will relax its grip and remain loose for the rest of the revolution of the wheel and will have a tendency to creep a small fraction of an inch so that it will occupy a different position on the carcass C at each successive revolution of the wheel and will in this way move completely around the tire in traveling a few miles and the wear on the carcass C will consequently be distributed equally around the circumference thereof.

The portions 2 and 3 of each of the members or units M are herein disclosed as substantially U-shape in cross section in order to afford a better gripping action upon a roadway or the like and also for maintaining the member or unit in its substantially rigid or non-expansible state. The channel 5 afforded by the cross sectional configuration of the portions 2 and 3 is free and unobstructed throughout its length and this is of importance as it has been fully demonstrated in practice that the channel is automatically freed of mud or the like by centrifugal force and it has also been demonstrated in practice that the weight of the load serves to force the mud or the like toward the opposite ends of the channel 5.

From the foregoing description, it is thought to be obvious that an anti-slipping device constructed in accordance with our invention is particularly well adapted for use by reason of the convenience and facility with which it may be assembled and operated and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. An anti-slipping device for a tire including a member adapted to straddle a tread portion of the tire, the intermediate portion of the member being substantially semi-elliptical with the free end portions thereof converging and terminating in outwardly disposed sleeves, the free extremities of the member being spaced apart a distance less than the major width of the tire to require the member to be applied to the tread portion of the tire when the tire is free of load by a slight pressure upon the member, and side members including links loosely disposed through the sleeves of the member.

2. An anti-slipping device for a tire including a member adapted to straddle the tread portion of the tire, the intermediate portion of the member being substantially semi-elliptical with the free end portions thereof converging, the free extremities of the member being spaced apart a distance less than the major width of the tire to require the member to be applied to the tread portion of the tire when the tire is free of load by a slight pressure upon the member, and side members engaged with the free extremities of the member.

In testimony whereof we hereunto affix our signatures in the presence of two witnesses.

SAM T. BUCHANAN.
HARRISON T. PORTER.

Witnesses:
H. LIVINGSTON,
CARL CARLSON.